US011717840B2

(12) United States Patent
Kalinich et al.

(10) Patent No.: US 11,717,840 B2
(45) Date of Patent: Aug. 8, 2023

(54) METAL FOAM DISPENSER AND METHOD OF USE FOR POLYURETHANE FOAM DISPENSING

(71) Applicant: Foam Supplies, Inc., Earth City, MO (US)

(72) Inventors: James Daniel Kalinich, Florissant, MO (US); Todd A. Keske, Chesterfield, MO (US); Christopher Price Miller, O'Fallon, MO (US); Kyle Evan Myers, Warrenton, MO (US)

(73) Assignee: Foam Supplies, Inc., Earth City, MO (US)

( * ) Notice: Subject to any disclaimer, the term of this patent is extended or adjusted under 35 U.S.C. 154(b) by 631 days.

(21) Appl. No.: 16/661,366

(22) Filed: Oct. 23, 2019

(65) Prior Publication Data

US 2021/0121898 A1    Apr. 29, 2021

(51) Int. Cl.
| | |
|---|---|
| *B05B 7/00* | (2006.01) |
| *B05B 7/12* | (2006.01) |
| *B05B 7/04* | (2006.01) |
| *B05B 1/30* | (2006.01) |
| *B05B 12/00* | (2018.01) |
| *B01F 23/235* | (2022.01) |

(52) U.S. Cl.
CPC .......... *B05B 7/0416* (2013.01); *B01F 23/235* (2022.01); *B05B 1/3026* (2013.01); *B05B 7/0018* (2013.01); *B05B 7/04* (2013.01); *B05B 7/12* (2013.01); *B05B 12/002* (2013.01)

(58) Field of Classification Search
CPC .......... B05B 7/0018; B05B 7/04; B05B 7/12; F16K 11/085
USPC .............. 251/625.446, 625.47; 137/625.446, 137/625.47
See application file for complete search history.

(56) References Cited

U.S. PATENT DOCUMENTS

| | | | |
|---|---|---|---|
| 3,780,758 A * | 12/1973 | DeVries | .................. F16K 25/00 137/454.6 |
| 4,202,497 A | 5/1980 | Ten Pas | |
| 4,263,166 A * | 4/1981 | Adams | .................. B05B 7/1209 239/113 |
| 4,676,437 A | 6/1987 | Brown | |
| 4,925,107 A | 5/1990 | Brown | |
| 5,529,245 A | 6/1996 | Brown | |
| 5,944,259 A | 8/1999 | Brown | |
| 6,431,468 B1 | 8/2002 | Brown et al. | |
| 6,991,185 B2 | 1/2006 | Brown | |
| 9,283,578 B2 | 3/2016 | Kim et al. | |
| 9,738,767 B2 | 8/2017 | Pignagnoli et al. | |
| 10,035,155 B2 | 7/2018 | Heckert et al. | |
| 10,322,385 B2 | 6/2019 | Schulz et al. | |
| 2003/0116647 A1 | 6/2003 | Brown | |

(Continued)

*Primary Examiner* — Jason J Boeckmann
(74) *Attorney, Agent, or Firm* — Stinson LLP

(57) ABSTRACT

A foam dispenser having a metal housing has a spool valve socket therein. A metal handle extends from the housing. A spool valve is disposable within the spool valve socket. A trigger couplable to the spool valve enables the spool valve to be rotated between open and closed orientations within the housing. The spool valve has internal channels for selectively passing liquids through the spool valve in the open orientation and not in the closed orientation. The spool valve also has a channel for selectively passing a gas through the spool valve in both the open and closed orientations.

23 Claims, 11 Drawing Sheets

(56) References Cited

U.S. PATENT DOCUMENTS

| | | |
|---|---|---|
| 2007/0187434 A1* | 8/2007 | Schrafel ............... B05B 7/0408 |
| | | 222/129 |
| 2010/0270400 A1* | 10/2010 | Evar .................... B05B 7/0408 |
| | | 239/414 |
| 2014/0054399 A1 | 2/2014 | Hsieh |
| 2018/0207667 A1 | 7/2018 | Black et al. |
| 2018/0243767 A1 | 8/2018 | Stewart et al. |
| 2018/0311625 A1 | 11/2018 | Valavala et al. |
| 2019/0151871 A1* | 5/2019 | Jerdee .................... B05B 15/55 |

* cited by examiner

METAL FOAM DISPENSER AND METHOD OF USE FOR POLYURETHANE FOAM DISPENSING

FIELD OF THE INVENTION

The present invention is in the field of polyurethane foams. More particularly, the invention relates to dispensers for the production and provision of polyurethane foams.

BACKGROUND OF THE INVENTION

Polyurethanes, defined as polymeric substances having multiple urethane linkages, are a large family of polymers with widely ranging properties and uses. Types of polyurethanes include rigid and flexible foams; thermoplastic polyurethane; and other miscellaneous types, such as coatings, adhesives, sealants and elastomers. When mixed with a blowing agent or gas, they become foams which are less dense and can be used for, e.g., insulation, flotation, cushioning, gluing, and sound absorption. Flexible foams (e.g., cushions) are generally open-celled materials, while rigid foams (e.g., building insulation, floats) usually have a high proportion of closed cells.

The process for making polyurethane foams typically involves the mixing of two or more liquid components in a foam production dispenser. Within the dispenser, a first liquid component (component A or "A-side") supplying, for example, isocyanate, is mixed with a second liquid component (component B or "B-side") supplying, for example, a blend of one or more polyols or other isocyanate reactive materials usually in the presence of one or more catalysts and other additives. One or both of the components can also include one or more blowing agents which cause the foam to expand and reduce the viscosity of the component, and surfactant which controls the formation and structure of the foam cells and facilitates the mixing of the two components. While surfactants are not typically introduced separately, these optional components can alternatively be introduced by a third feed. If the components do not include a gaseous blowing agent, the resulting mixture may have a higher viscosity. Larger diameter feed channels and/or the application of a pressurized gas as a component may be as necessitated to address higher viscosity materials or a desired higher dispense rate.

A dispenser for receiving a fluid flow of each of the individual components and for selectively mixing the components together prior to dispensing the resulting foam is sometimes referred to as a foam gun. The dispenser typically includes a housing with an inlet side for receiving each component within a respective channel, a valve member controlling the flow of one or both components through the dispenser, a mechanical interface for selectively receiving a mix tube having a static mixer therein in which the components are mixed and the foam is created, and an outlet through which flows the foam.

The inlet side of a typical foam dispenser is provided with a mechanical coupling device for connecting an inlet end of each channel to a respective component supply hose, tube, or pipe. An outlet end of each channel is in fluid communication with a respective portion of the valve member, which may be a spool valve. A spool valve is in mechanical communication with a trigger or lever that is manipulated by an operator, much as in the operation of a trigger on a firearm. As the trigger is pulled, the spool valve is rotated within the dispenser housing from a closed orientation to an open orientation. Fluid channels formed on the periphery of or through the spool valve are brought into alignment with the outlet ends of the channels, thus allowing the components to flow around or through the spool valve. A resilient member such as a spring is typically employed in conjunction with the trigger for automatically returning the trigger to a rest position in which the spool valve is closed.

Foam components which flow around or through the spool valve within the dispenser housing then enter a mix tube having a static mixer. The mix tube may be engaged with the foam dispenser via a threaded coupling. This static mixer may force the components to interact and mix prior to exiting a respective mix tube outlet port. The mixing chamber may be separable from the remainder of the housing and disposable. Residual amounts of components may accumulate and partially or completely block the mixing chamber, thus necessitating its replaceability.

The use of high pressure impingement for liquid component mixing may have advantages in terms of allowing the use of higher viscosity ingredients which may enhance the properties of the foam. Foam dispensers configured for low pressure mixing utilize a static mixer. However, such low pressure dispensers are typically provided of plastic with relatively small channels which are otherwise inappropriate for use with high viscosity components. The use of a separate gas stream facilitates the mixing of higher viscosity components. However, a plastic dispenser has a risk of fracturing and may have loose tolerances between components having fluid flow channels interfacing each other.

U.S. Pat. No. 10,035,155 to Heckert, et al. discloses a foam dispenser including a housing having a cylindrical bore in which is disposed a cylindrical spool valve. The barrel-shaped valve is configured to be inserted and removed from either side of the housing. A trigger having a forked upper extent is mechanically attached to the opposite ends of the valve. This requires precise dimensioning of the trigger forked portions to ensure that channels formed within the respective spool valve are accurately laterally aligned with deformable sealing plugs in at least two of the feed channels, on the one hand, and the respective dispensing channels leading to the mixing chamber, on the other hand.

In addition, the Heckert, et al., patent requires a nipple in each of the at least two feed channels of the housing that also contain deformable sealing plugs, an inner end of each nipple pressing directly against an outer end of the respective deformable sealing plug. These additional components increase the cost and complexity of the disclosed foam dispenser.

Further, the spool valve in Heckert, et al., provides a flow passage therethrough for each of three components. Two configurations are shown and described, one in which all three flow passages are coplanar and one in which two flow passages are coplanar and one flow passage is angled. Both configurations, however, provide a flow path for each component only when the spool valve is rotated into an "open" position; when in a "closed" position, the flow passages are out of alignment both with the feed channels, on the one hand, and the dispensing channels, on the other hand.

What is needed are reusable dispensers that can accommodate higher and lower viscosity foam components and mixtures, and a spool valve that enables efficient, accurate delivery of foam components to a mixing chamber and automatic clearing of component channels to facilitate dispenser re-use.

SUMMARY OF THE INVENTION

It has been discovered that a metal housing for a foam dispensing dispenser provides certain advantages over the prior art devices. Higher component inlet pressures may be used without concern for the mechanical failure of dispenser parts. High strength fastening techniques may be employed at the interface between liquid supply lines and the housing. The improved tolerances between metal, machined components also enable the use of high-pressure liquids with less concern for leakage and fouling. A more rugged tool results which facilitates cleaning and re-use.

This discovery has been exploited to develop the present disclosure, which, in part, is directed to a metal housing for a foam dispenser and which, in part, is directed to an improved spool valve. The housing is provided with a spool valve socket for selectively receiving the improved spool valve. A gas channel is provided within the spool valve for enabling the flow of gas through the liquid flow channels when the spool valve is disposed in an off or closed orientation. This flow of gas through the liquid channels in the off orientation facilitates the clearing of residual liquids from the flow path leading to the static mixer of an attached mix tube and thus avoids the unintentional mixing and clogging of the liquid components.

In one aspect, the disclosure provides a foam dispenser. The foam dispenser comprises a metal housing having an inlet end, an outlet end, and a spool valve socket intermediate the inlet end and the outlet end. The spool valve socket extends laterally between opposite sides of the housing. Plural inlet channels are formed in the metal housing between the inlet end and the spool valve socket. Similarly, plural outlet channels are formed in the metal housing intermediate the spool valve socket and the outlet end. A metal handle is in mechanical communication with the metal housing proximate the inlet end thereof. A substantially cylindrical spool valve having first and second opposite ends is selectively disposable within the spool valve socket. A removable spool valve facilitates cleaning of the spool valve and the housing. A trigger is mechanically couplable to the first and second opposite ends of the spool valve once the spool valve is disposed within the spool valve socket. A resilient member such as a coiled or leaf spring is intermediate the trigger and the housing or the handle for mechanically biasing the trigger away from the handle when spool valve is disposed within the spool valve socket and the trigger is coupled to the first and second opposite ends of the spool valve. A mix tube with internal static mixer is configured to be selectively mechanically engaged with the outlet end of the metal housing. The mix tube affixed to the outlet end has an opening into an internal static mixer in registration with the plural outlet channels in the metal housing outlet end, and an outlet port.

In an embodiment, the plural inlet channels in the metal housing inlet end are substantially circular in cross-section and are provided with internal threads for cooperatively receiving feed supply lines having complimentary threaded grooves on an external surface thereof. Other cross-sectional geometries may be employed.

In an embodiment, the spool valve has, within the spool valve socket, a closed orientation and an open orientation. The spool valve has first channels therein. The inlet to each channel in the spool valve is in registration with a respective one of the plural inlet channels and a respective one of the plural outlet channels when the spool valve is in the open orientation within the spool valve socket and is not in registration with a respective one of the plural inlet channels and a respective one of the plural outlet channels when the spool valve is in the closed orientation.

In an embodiment, the spool valve further comprises at least one second channel therein. The at least one second channel is in registration with a respective one of the plural inlet channels and a respective one of the plural outlet channels when the spool valve is in the open orientation and in the closed orientation.

In an embodiment, the spool valve further comprises at least one third channel in communication with the at least one second channel. The at least one third channel is in registration with a respective one of the plural outlet channels when the spool valve is in the closed orientation.

In an embodiment, the spool valve comprises a first O-ring intermediate each third channel and the respective outlet channel when the spool valve is in the closed orientation.

In an embodiment, the spool valve further comprises a second O-ring on the spool valve outer surface radially opposite each first O-ring. The first and second O-rings are intermediate the spool valve and the spool valve socket.

In an embodiment, the first and second O-rings are each received within a respective circular depression within an outer surface of the spool valve.

In an embodiment, the spool valve comprises a valve body with a substantially circular flange on one end of the valve body. The flange is coaxial with the valve body and has a diameter greater than the maximum diameter of the valve body.

In an embodiment, the housing comprises a substantially circular recess on an outer surface of a side of the housing about the spool valve socket. The recess is dimensioned to receive the spool valve flange therein.

In an embodiment, the flange has a radial region of decreased diameter relative to the remainder of the substantially circular flange and the substantially circular recess has a projection extending inwardly from an outer diameter of the recess. The projection extends into the radial region of decreased diameter when the spool valve is disposed within the spool valve socket.

In an embodiment, the spool valve is rotatable within the spool valve socket in a first direction until the radial projection abuts a first end of the radial region of decreased diameter and is rotatable within the spool valve socket in a second, opposite direction until the radial projection abuts a second end of the radial region of decreased diameter. Thus, the radial projection cooperates with the radial region of decreased diameter to limit the degree to which the spool valve is rotatable within the spool valve socket.

In another aspect, the disclosure provides a method of generating foam. The method includes providing a foam dispenser. The foam dispenser includes in part a metal housing having an inlet end, an outlet end, and a spool valve socket intermediate the inlet end and the outlet end. The spool valve socket extends laterally between opposite sides of the housing. The metal housing also includes plural inlet channels formed in the housing intermediate the inlet end and the spool valve socket, and plural outlet channels formed in the metal housing intermediate the spool valve socket and the outlet end. The foam dispenser also includes a metal handle in mechanical communication with the housing proximate the inlet end thereof, a substantially cylindrical spool valve having first and second opposite ends, disposable within the spool valve socket, and a trigger mechanically couplable to the first and second opposite ends of the spool valve. The foam dispenser also includes a resilient member intermediate the trigger and at least one of the housing and the handle for mechanically biasing the trigger away from the handle when spool valve is disposed within the spool valve socket and the trigger is coupled to the first and second opposite ends of the spool valve. The foam dispenser further includes a mix tube adapter for selectively receiving a mix tube with internal static mixer. The mix tube adapter is configured to enable a mix tube to be selectively mechanically engaged to the outlet end of the metal housing, the mix tube having an opening into the static mixer in registration with the plural outlet channels in the metal housing outlet end, and an outlet port. The method also includes connecting a respective liquid supply line to plural ones of the plural inlet channels in the metal housing and selectively actuating the trigger to rotate the spool valve within the spool valve socket from a closed orientation to an open orientation. Once in the open configuration, liquid provided by the liquid supply lines flows through the spool valve to the outlet end and into the static mixer, thus generating foam.

In an embodiment, connecting a respective liquid supply line to plural ones of the plural inlet channels comprises threading a male threaded connector provided on an end of the liquid supply line into a female threaded socket forming a portion of the respective inlet channel.

In an embodiment, the method further includes connecting a respective gas supply line to at least one of the plural inlet channels in the metal housing.

In an embodiment, the spool valve has plural first channels therein. Each of the first channels in the spool valve is in registration with a respective one of the plural inlet channels and a respective one of the plural outlet channels when the spool valve is in the open orientation within the spool valve socket. Each of the first channels in the spool valve is not in registration with a respective one of the plural inlet channels and a respective one of the plural outlet channels when the spool valve is in the closed orientation.

In an embodiment, the spool valve further includes at least one second channel that is in registration with a respective one of the plural inlet channels and a respective one of the plural outlet channels when the spool valve is in the open orientation and in the closed orientation.

In an embodiment, the spool valve further comprises at least one third channel in communication with the at least one second channel. The at least one third channel is in registration with a respective one of the plural outlet channels when the spool valve is in the closed orientation.

In an embodiment, the method further includes connecting a respective gas supply line to at least one of the plural inlet channels that is in registration with a respective one of the at least one second channel of the spool valve. Gas delivered by the gas supply line is flowed through the respective one of the at least one second channel, into the respective one of the at least one third channel, and out through the respective one of the plural outlet channels and into the mix tube static mixer when the spool valve is in the closed orientation.

In an embodiment, the method further includes connecting a respective gas supply line to at least one of the plural inlet channels that is in registration with a respective one of the at least one second channel of the spool valve. Gas delivered by the gas supply line is flowed through the respective one of the at least one second channel and out through the respective one of the plural outlet channels and into the mix tube static mixer when the spool valve is in the open orientation.

In an embodiment, the spool valve comprises a valve body and a substantially circular flange on one end of the valve body. The flange is coaxial with the valve body and has a diameter greater than the maximum diameter of the valve body. The housing comprises a substantially circular recess on an outer face of the housing about the spool valve socket for receiving the spool valve flange therein. The flange has a radial region of decreased diameter relative to the remainder of the substantially circular flange and the substantially circular recess has a projection extending inwardly from an outer diameter of the recess. The projection extends into the radial region of decreased diameter when the spool valve is disposed within the spool valve socket. The step of selectively actuating the trigger to rotate the spool valve within the spool valve socket from a closed orientation to an open orientation includes rotating the spool valve within the spool valve socket in a first direction until the radial projection abuts a first end of the radial region of decreased diameter and rotating the spool valve within the spool valve socket in a second, opposite direction until the radial projection abuts a second end of the radial region of decreased diameter. The radial projection thus cooperates with the radial region of decreased diameter to limit the degree to which the spool valve is rotatable within the spool valve socket.

In yet another aspect, the disclosure provides a spool valve for use in a foam dispenser. The spool valve includes a substantially cylindrical spool valve body having first and second opposite ends, a substantially cylindrical outer surface between the first and second ends, and an axis of symmetry about which the substantially cylindrical outer surface is equidistant. The spool valve further includes plural first channels formed within the spool valve body. Each of the first channels in the spool valve body lies within a plane that is orthogonal to the axis of symmetry. A first channel inlet of each first channel is on the substantially cylindrical outer surface and a first channel outlet of the first channel is on the substantially cylindrical outer surface. The respective first channel inlet and first channel outlet are radially separated by 120 degrees or more about the axis of symmetry.

The spool valve further includes at least one second channel formed within the spool valve body. Each of the at least one second channel lies within a plane that is orthogonal to the axis of symmetry. Each of the at least one second channel has two second channel inlets on the substantially cylindrical outer surface and two second channel outlets on the substantially cylindrical outer surface. The second channel inlets and second channel outlets are in mutual communication within the spool valve body. The two second channel inlets and the two second channel outlets each are radially separated by between 5 and 30 degrees about the axis of symmetry. The respective second channel inlets and second channel outlets are radially separated by 120 degrees or more about the axis of symmetry.

In an embodiment, the spool valve includes at least one third channel within the spool valve body. Each of the at least one third channel has a first segment that is parallel to the axis of symmetry and at least one second segment that is orthogonal to the axis of symmetry. Each third channel has at least one outlet on the surface of the substantially cylindrical outer surface. Each third channel interconnects a respective one of the at least one second channel with the at least one third channel outlet.

In an embodiment, each second segment outlet and a first channel outlet lie within a plane that is orthogonal to the axis of symmetry.

In an embodiment, the first and second opposite ends are each orthogonal to the axis of symmetry.

In an embodiment, the first opposite end has a flange that has a diameter that is greater than each of the second opposite end and the substantially cylindrical outer surface, the flange lying in a plane that is orthogonal to the axis of symmetry.

In an embodiment, the flange has a radial region of decreased diameter relative to the remainder of the flange. The region of decreased diameter is for receiving a projection extending inwardly from an outer diameter of a spool valve socket recess when the spool valve body is disposed within the spool valve socket.

In an embodiment, the spool valve further comprises at least one pair of O-rings on the substantially cylindrical outer surface. Each pair of O-rings has center points lying within a plane that is orthogonal to the axis of symmetry and are radially separated by substantially 180 degrees about the axis of symmetry on the substantially cylindrical outer surface.

In an embodiment, each O-ring is partially received within a respective circular recess within the surface of the substantially cylindrical outer surface.

DESCRIPTION OF THE DRAWING

Various aspects of at least one embodiment of the present invention are discussed below with reference to the accompanying figures. It will be appreciated that, for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, however, not every component may be labeled in every drawing. The figures are provided for the purposes of illustration and explanation and are not intended as a definition of the limits of the invention. In the figures.

DESCRIPTION

Figure 1:
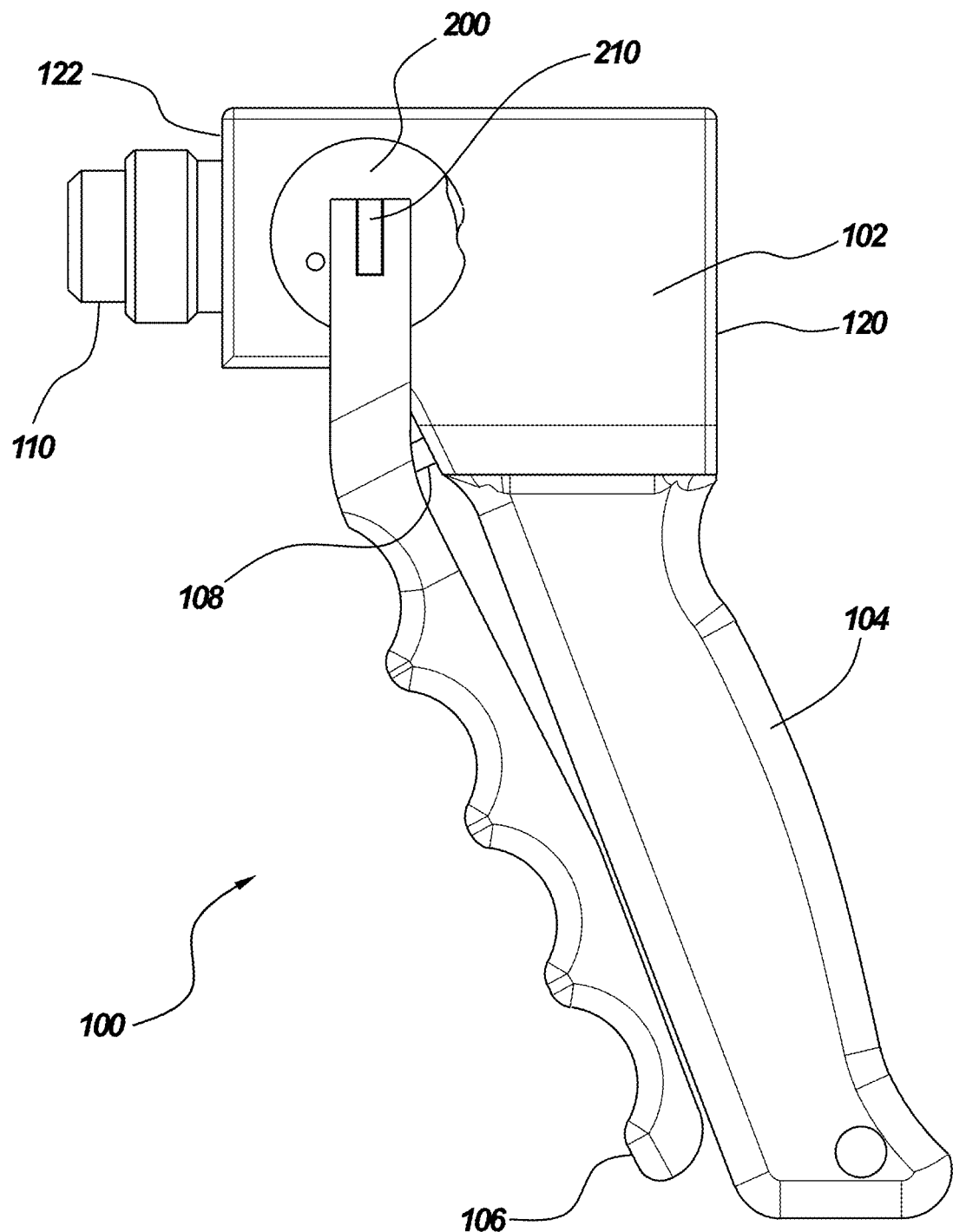
FIG. 1 is a side view of a foam dispenser with spool valve according to the present disclosure.

In the following detailed description, numerous specific details are set forth in order to provide a thorough understanding of the various embodiments of the present invention. It will be understood by those of ordinary skill in the art that these embodiments of the present invention may be practiced without some of these specific details. In some instances, well-known methods, procedures, components and structures may not be described in detail so as not to obscure the embodiments of the present invention.

Unless defined otherwise, all technical and scientific terms used herein have the same meaning as commonly understood by one of ordinary skill in the art to which this disclosure belongs. The initial definition provided for a group or term herein applies to that group or term throughout the present specification individually or as part of another group, unless otherwise indicated.

The present invention relates to a dispenser in which a polyurethane foam is mixed and from which the mixture is dispensed to a target discontinuous or moving continuous surface, or open or closed mold or cavity, and a spool valve for use therein and for use in other foam dispenser configurations. Rigid pour-in-place and spray foams, as well as other types of polyurethane foams can be prepared within the dispenser. Pour-in-place systems have slower reactivity, allowing the foam to flow well before and during its expansion to allow a (usually) closed cavity to fill with foam (e.g., a refrigerator). Some spray foams have very fast reactivity to allow application to vertical and horizontal overhead open cavities (e.g., walls and underside of roof decks). High pressure spray foam components are normally supplied in 55-gallon drums or 275-gallon intermediate bulk containers (IBC's), though they could also be in pressurized cylinders. Low pressure spray foams are typically shipped and dispensed from returnable or disposable gas cylinders.

The presently disclosed metal dispenser can accommodate multicomponent foams that contain gaseous and/or liquid blowing agent, and those that do not. When foams with gaseous blowing agents are dispensed, the mixed components immediately expand into a foam or froth before they start to react. Once the reaction between the mixed components starts, the foam continues to rise until it achieves the final density when the foam is cured. The "pre-expansion" from the gaseous blowing agent prior to the polymerization reaction provides processing advantages for certain applications because the pressure exerted by the rising foam is greatly reduced. Liquid blowing agents like ECOMATE®, which cause the foam to expand when the heat from the polymerization reaction causes them to boil, can be a part of either of the two liquid (e.g., polyol or isocyanate) components. When the liquid mixture is dispensed, the blowing agent goes from liquid to gas, causing the mixture to froth or expand prior to the polymerization reaction.

Alternatively, gaseous blowing agents (GBA's) that are gas at ambient temperature can be introduced as a third stream in place of air to froth the mixture as it is dispensed. There are two needs for a dispenser with a third component:

(1) to assist in the mixing of the two liquid components, especially when they are high in viscosity; and (2) to eliminate the need for a gaseous blowing agent. The most common GBA being used today, HFC-134a, is being phased out by governmental regulation due to its adverse effects on global warming. The alternative "zero Global Warming Potential" GBA's available are typically unstable and can cause degradation of the polyol component when blended together. However, the use of a separately delivered GBA in a third stream significantly lowers the viscosity of the polyol component, so being able to introduce the third stream assists the mixing of the components and to some degree also "froths" the foam mixture.

Table 1 lists exemplary liquid and gaseous blowing agents.

TABLE 1

| Short Name | Chemical Name | Liquid or Gas |
| --- | --- | --- |
| Ecomate | Methyl Formate | Liquid |
| HFC-245fa | 1,1,1,3,3-Pentafluoropropane | Liquid |
| HFC-134a | 1,1,1,2-Tetrafluoroethane | Gas |
| HCFO-1233zd E | trans-1-Chloro-3,3,3-trifluoropropene | Liquid |
| HFO-1234ze(E) | trans-1,3,3,3-tetrafluoropropene | Gas |
| HFO-1336mzzm(z) | (Z)-1,1,1,4,4,4-Hexafluoro-2-butene | Liquid |
| HFO-1336mzzm(e) | (E)-1,1,1,4,4,4-Hexafluoro-2-butene | Gas |
| Carbon dioxide | Carbon dioxide | Gas |

Water may be incorporated into the polyol component, often in combination with liquid and/or gaseous blowing agents. Once the polyol component is mixed with the isocyanate component, the water reacts with the isocyanate to create carbon dioxide, which also acts as a blowing agent.

Various types of foam processes are described in the following, some of which may be practiced using the metal foam dispenser and spool valve as disclosed herein.

A first pour-in-place insulation foam process uses a liquid blowing agent such as ECOMATE®, HFC-245fa, HCFO-1234zd or HFO-1336mzzm(z). The B-side liquid viscosity is <1000 cps and is provided from an $N_2$ pressured cylinder. The cylinder pressure and/or dispenser orifice size limit the foam pressure. A solvent-less urethane gun (SLUG) with third stream gas assist and external static mixer tube is used at 150-250 psi. The Foam Supplies, Inc. (FSI) ECOFOAM® is a commercial product example. It is a standard pour-in-place system.

A second pour-in-place insulation foam process also uses a liquid blowing agent such as ECOMATE®, HFC-245fa, HCFO-1234zd or HFO-1336mzzm(z). The B-side liquid viscosity is <1000 cps and is provided from an $N_2$ pressurized cylinder. The cylinder pressure and/or dispenser orifice size limit the foam pressure. A two-component dispenser with third stream gas assist with external mixer tube, such as described herein, is used at 150-250 psi. The FSI ECOFOAM® is a commercial product example.

A third pour-in-place insulation foam process uses a gaseous blowing agent such as HFC-134a, HFO-1234ze(E) or HFO-1336mzzm(e). The B-side is provided from an $N_2$ pressurized cylinder. The cylinder pressure and/or dispenser channel size limit the foam pressure. An FSI SLUG™ with third stream gas assist and external static mixer tube is used at 150-250 psi. The FSI 87a series is a commercial product example. It is a standard froth pour-in-place system.

A first high pressure spray foam insulation process uses a liquid blowing agent such as ECOMATE®, HFC-245fa, HCFO-1234zd or HFO-1336mzzm(z). The B-side liquid viscosity is between 500 and 1500 cps and is provided from a drum or IBC. The liquid component pressure and mixing ratio are controlled by a high pressure mechanical proportioner, such as the Graco REACTOR®. The components mix through a high pressure (1200-1800 psi) impingement dispenser with air assist such as the Graco FUSION® dispenser. The FSI ECOSTAR® ccSPF, FSI ecoroof, and FSI genspray are commercial product examples. They are standard high pressure spray foam systems.

A second high pressure spray foam insulation process uses a liquid blowing agent such as ECOMATE®, HFC-245fa, HCFO-1234zd or HFO-1336mzzm(z). The B-side liquid viscosity is between 500 and 1500 cps and is provided from an $N_2$ pressurized cylinder. The foam pressure is limited by a low pressure mechanical proportioner, such as Titan HELIX®. A two-component dispenser with third stream gas assist with external mixer tube, such as described herein, or similar to the DuPont Ultra System or the Wayne Spray Tech PROPURGE® is used at below 150 psi. The FSI ECOSTAR® ccSPF, FSI ecoroof, FSI genspray, and DuPont Froth Pak Ultra are commercial product examples. They enable high viscosity components to be processed through a low pressure proportioner with gas assist.

A first low pressure spray foam insulation foam process uses a gaseous blowing agent such as HFC-134a, HFO-1234ze(E) or HFO-1336mzzm(e). The B-side estimated viscosity of liquid under pressure in the cylinder is <50 cps and is provided from an $N_2$ pressurized cylinder. The cylinder pressure and/or dispenser channel size limit the foam pressure. A two-component dispenser with external static mixer tube is used at 150-250 psi. The FSI Spritzer, FSI Thermafroth or DuPont Froth Pak are commercial product examples. They are a standard low pressure systems.

A second low pressure spray foam insulation foam process uses a liquid blowing agent such as ECOMATE®, HFC-245fa, HCFO-1234zd or HFO-1336mzzm(z). The B-side liquid viscosity is between 500 and 1500 cps and is provided from an $N_2$ pressurized cylinder. The cylinder pressure and/or dispenser channel size limit the foam pressure. A two-component dispenser with third stream gas assist with external mixer tube, such as described herein, is used at 150-250 psi. This is a low pressure spray foam system that does not require a gaseous blowing agent.

With reference to the attached drawings, disclosed is a foam dispenser having a metal housing and a spool valve for use therein and for us in foam dispensers of other configurations and construction, whether having a housing of metal or plastic.

With reference to FIGS. 1-12, a foam dispenser 100 comprises a housing 102 and a handle 104. Preferably, at least the housing is formed of metal; the handle may be of metal as well. In one embodiment, the metal chosen is aluminum due to its strength and relatively low weight, though other metals or metal alloys may be utilized. An advantage of providing at least the housing in metal, particularly when a third, gaseous stream is employed, is that higher pressure mixing can be accommodated as compared to that realizable with a plastic housing. Higher pressure mixing allows higher viscosity components to be utilized. Metal also enables a durable housing and/or spool valve that may be cleaned and reused.

The housing 102 includes a rearward face or inlet end 120, a forward face or outlet end 122, a first side 126, a second side 128, a top face 140, a bottom face 142. In an illustrated embodiment, the housing has a roughly rectangular solid shape, though other configurations may be employed. Disposed laterally through the housing, from the first side to the second side, is a substantially cylindrical spool valve socket 124. A mix tube adapter 110 is disposed on the forward face of the housing. In one embodiment, the mix tube adapter is integrally formed with the housing in order to provide a more rigid, breakage resistant unitary structure. The mix tube adapter is configured to selectively receive a mix tube with internal static mixer, which may be of a standard form factor. Mutually cooperating screw threads may enable the secure, releasable connection between mix tube and housing via the mix tube adapter. In use, liquids and optionally a gas are received within the mix tube, once engaged with the mix tube adapter, and are mixed to generate a foam that is dispensed from the mix tube in a conventional manner.

Figure 9:
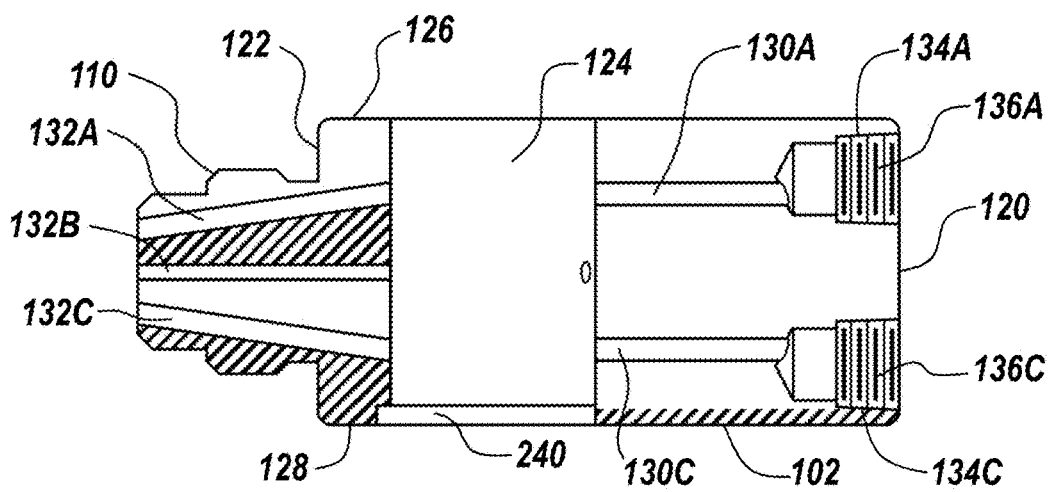
FIG. 9 is a top section view of the housing of FIGS. 5 and 6.
Figure 10:
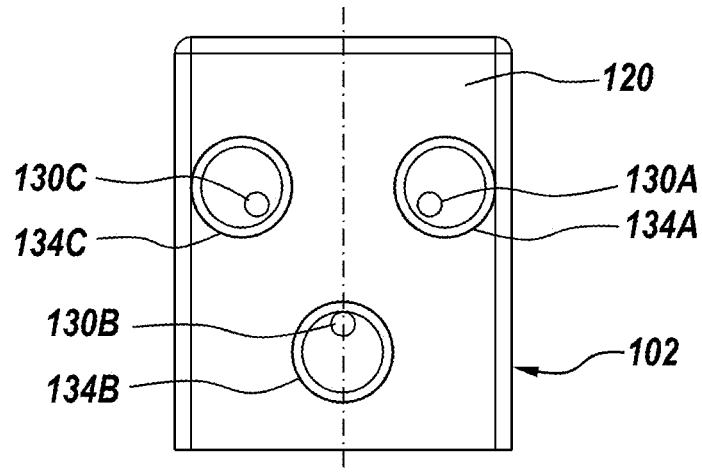
FIG. 10 is a rear view of the housing of FIGS. 5 and 6.
Figure 11:
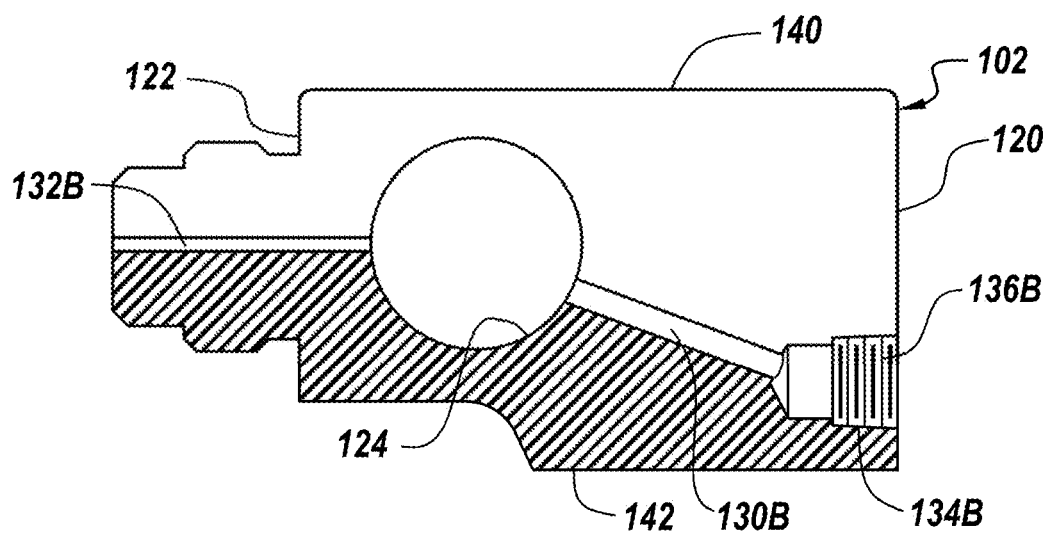
FIG. 11 is a side section view of the housing of FIGS. 5 and 6.

With respect to FIGS. 9-11, plural inlet channels 130A, 130B, 130C are disposed or formed within the housing, each providing a fluid channel or pathway between the housing rearward face 120 and the spool valve socket 124. Similarly, plural outlet channels 132A, 132B, 132C are disposed or formed within the housing, each providing a fluid channel or pathway between the spool valve socket and the mix tube adapter 110 at the forward face 122 of the housing. The inlet and outlet channels are preferably circular in cross-section for minimized resistance to fluid flow therein though other cross-sectional geometries may be employed.

Figure 6:
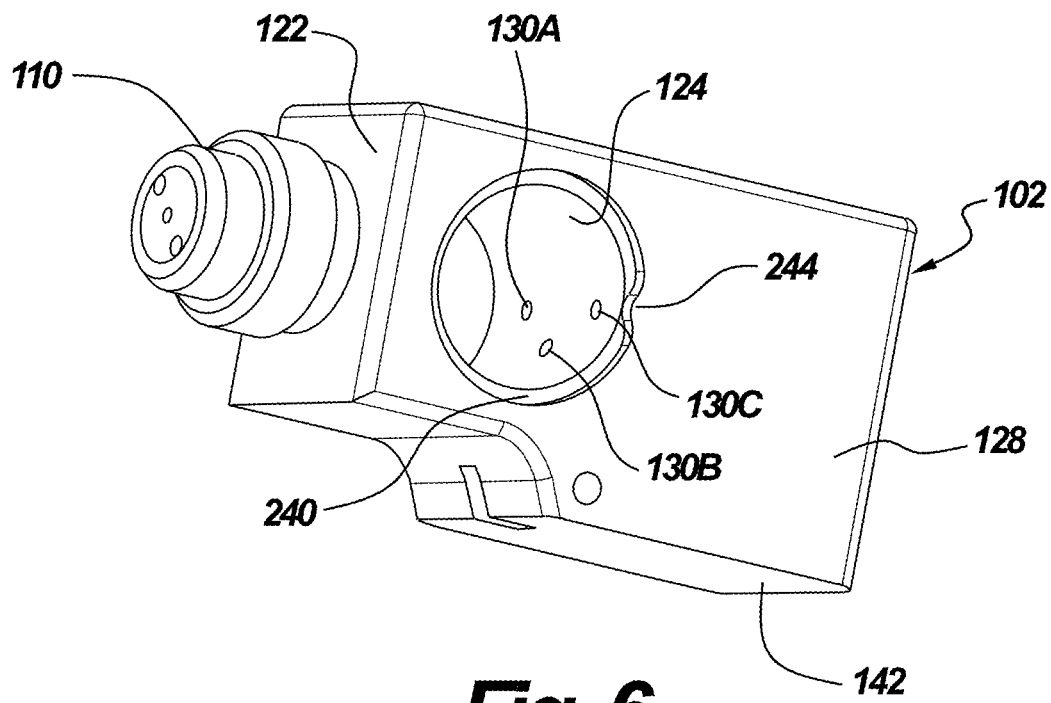
FIG. 6 is another perspective view of the housing of FIG. 5.
Figure 7:
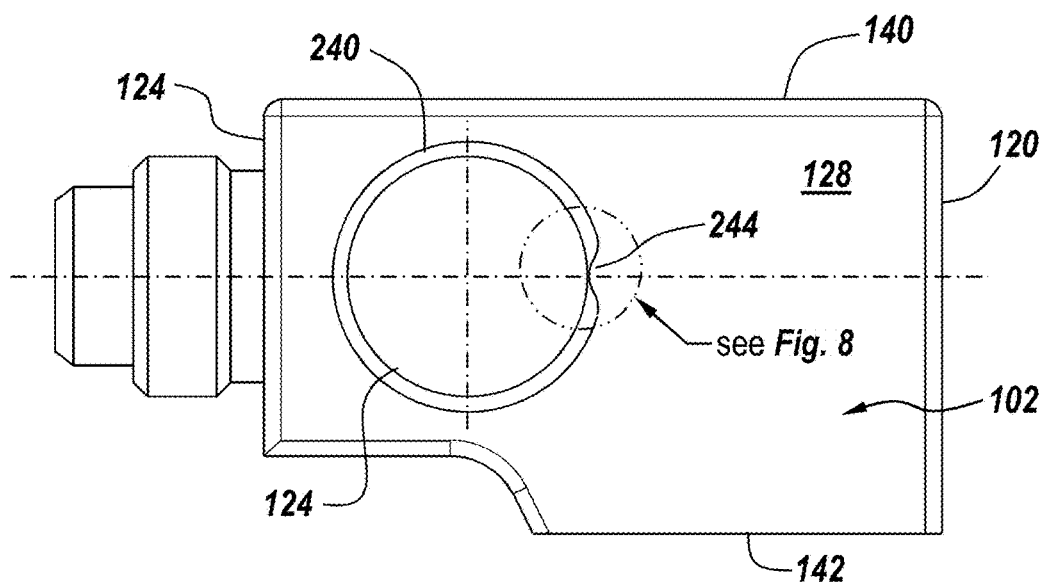
FIG. 7 is a side view of the housing of FIGS. 5 and 6.
Figure 8:
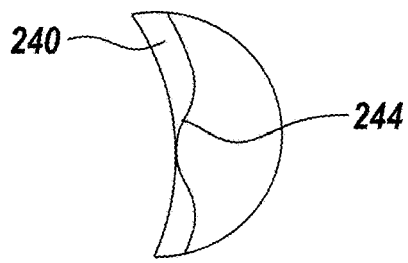
FIG. 8 is a detail view of a portion of the housing of FIGS. 5 and 6.

As viewed in FIGS. 6, 7, and 8, disposed within the rearward face or inlet end 120 of the housing 102 are sockets 134A, 134B, 134C, each for and in communication with a respective one of the inlet channels 130A, 130B, 130C. The sockets in one embodiment include internal threads 136A, 136B, 136C formed into the metal of the housing and are dimensioned to releasably receive external, complimentary threads formed on one end of a respective supply line. The supply lines may connect the housing to containers or other sources of liquids and/or gases utilized in the foam production process. Preferably, the sockets are formed orthogonally to the rearward face. Selectively mating the supply lines to the housing via complimentary internal and external metal threads enables the provision of fluids at higher pressures than would otherwise be employable with a prior art plastic housing receiving supply lines via quick connect or other types of easily releasable fittings.

In the illustrated embodiment, there are three inlet channels 130A, 130B, 130C and three complimentary outlet channels 132A, 132B, 132C. This embodiment includes two inlet channels 130A, 130C and respective sockets 134A, 134C that each lie within a respective horizontal plane between the housing rearward face or inlet end 120 and the spool valve socket 124. Disposed laterally between these two inlet channels is a third inlet channel 130B which is provided at an angle between the rearward face or inlet end and the spool valve. In particular, socket 134B and the rearmost end of this inlet channel 130B are disposed below the plane of the inlet channels 130A, 130C and respective sockets 134A, 134C. The forwardmost end of this inlet channel 130B within the spool valve socket 124 is also below the plane of the other two inlet channels 130A, 130C, but higher than the respective rearward-most end, as best seen in FIGS. 6, 10 and 11.

With respect to FIGS. 9 and 11, the outlet channels 132A, 132B, 132C lie within the same substantially horizontal plane, from the spool valve socket 124 to the forward face or outlet end 124 of the housing 102 and through the mix tube adapter 110 for engagement with a conventional mix tube (not shown) mounted thereon. The plane of the outlet channels may be the same plane as contains the two horizontal inlet channels 130A, 130C.

Figure 2:
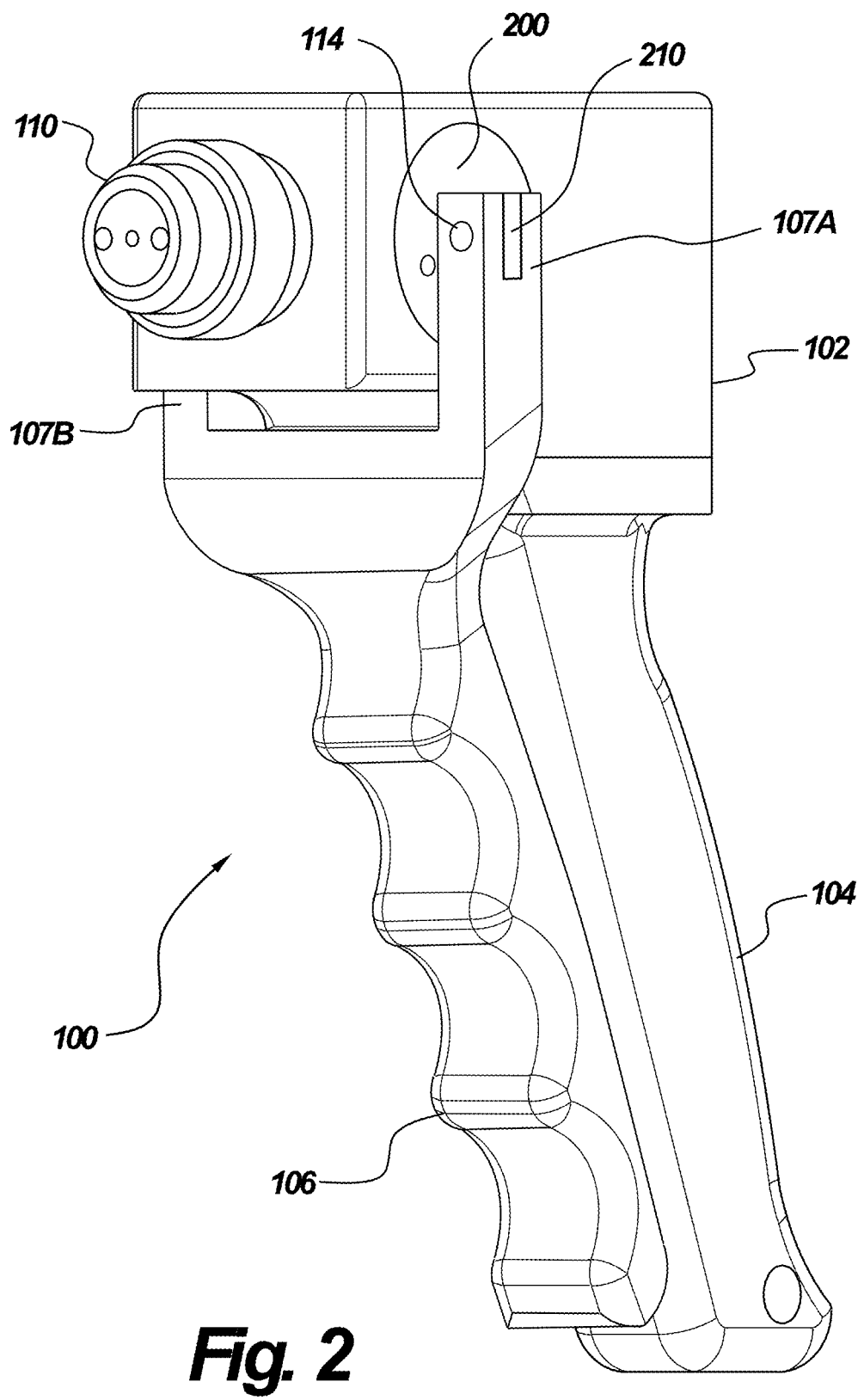
FIG. 2 is a perspective view of the foam dispenser of FIG. 1.
Figure 3:
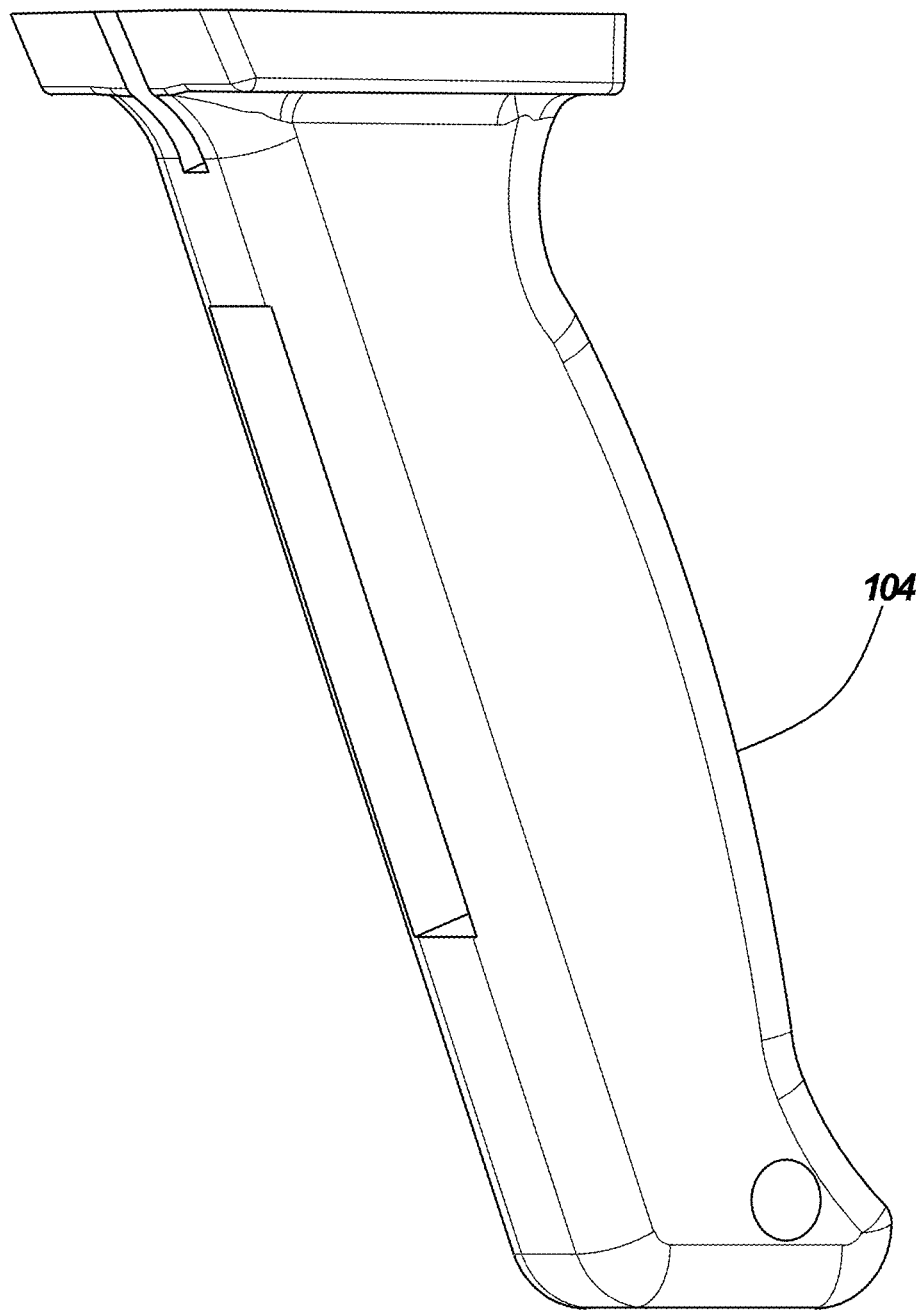
FIG. 3 is a side view of a handle for use in the foam dispenser of FIG. 1.
Figure 4:
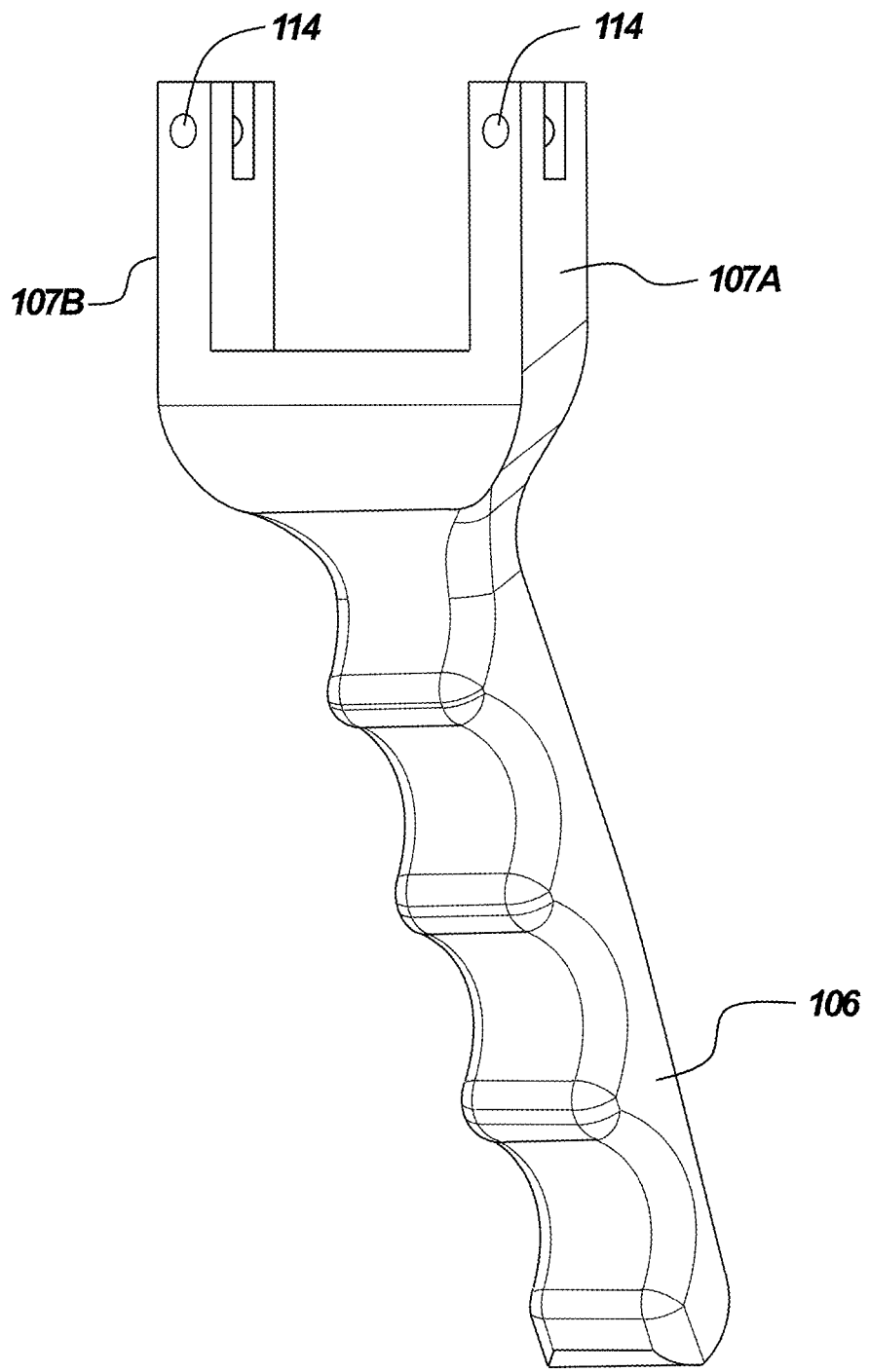
FIG. 4 is a perspective view of a trigger for use in the foam dispenser of FIG. 1.
Figure 5:
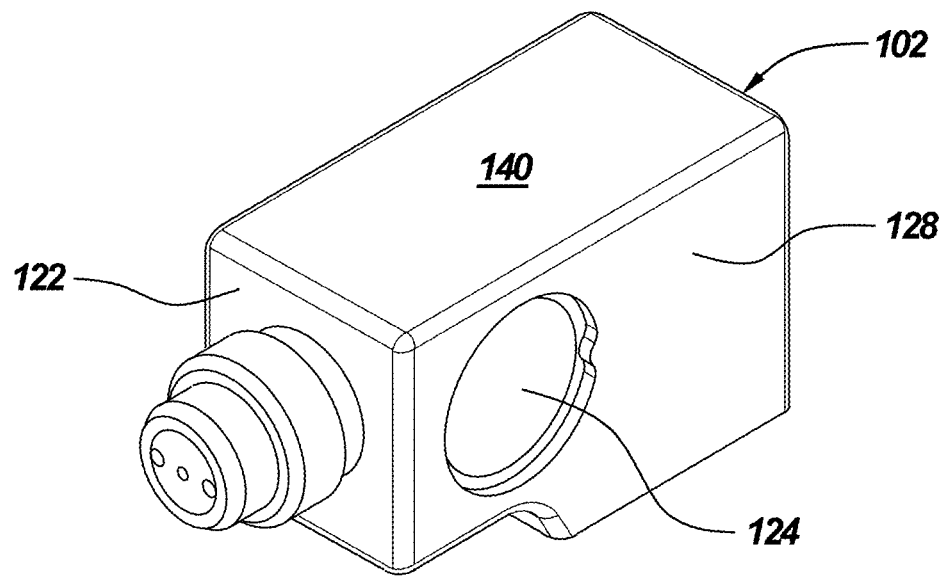
FIG. 5 is a perspective view of a housing for use in the foam dispenser of FIG. 1.
Figure 12:
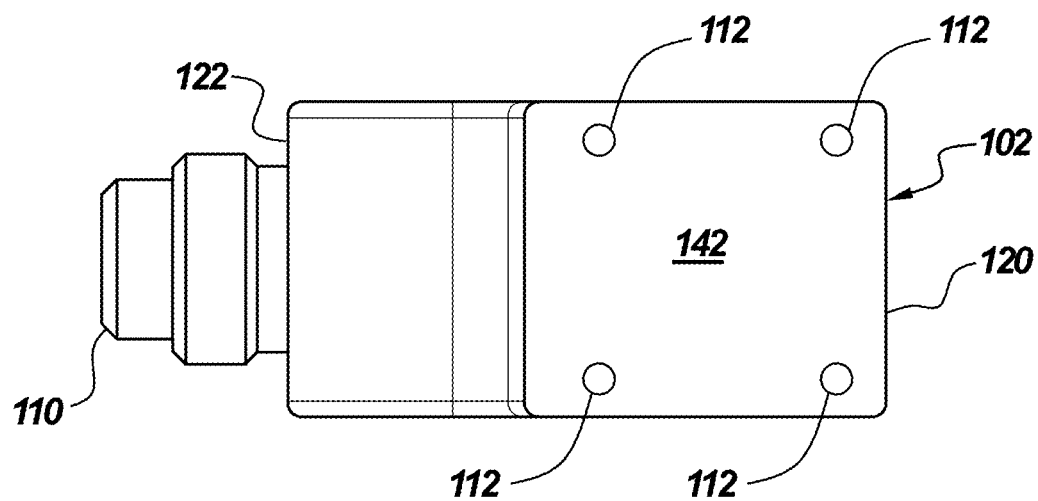
FIG. 12 is a bottom view of the housing of FIGS. 5 and 6.
Figure 13:
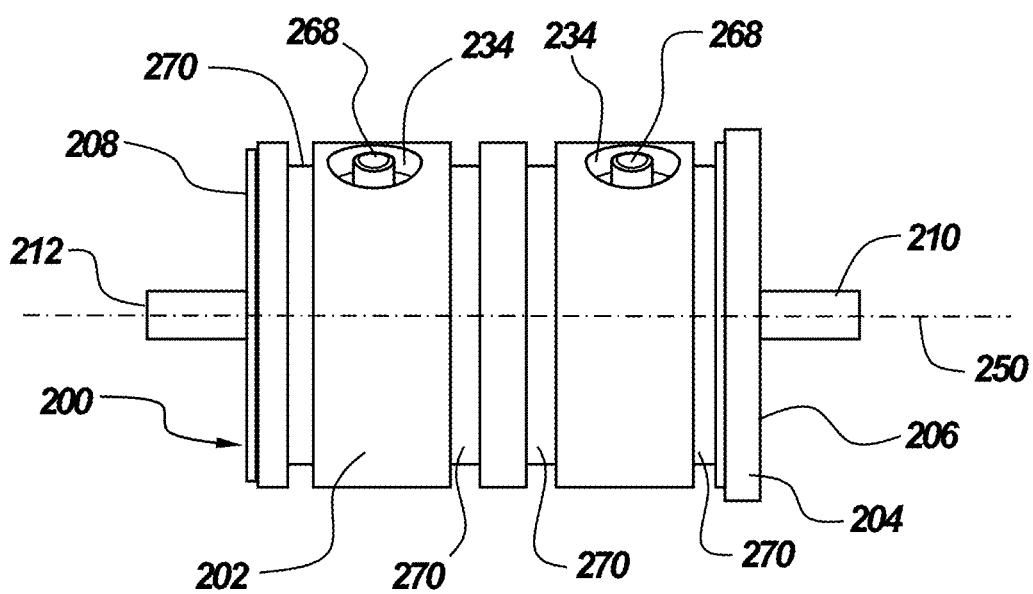
FIG. 13 is a bottom view of a spool valve for use in the foam dispenser of FIG. 1.
Figure 14:
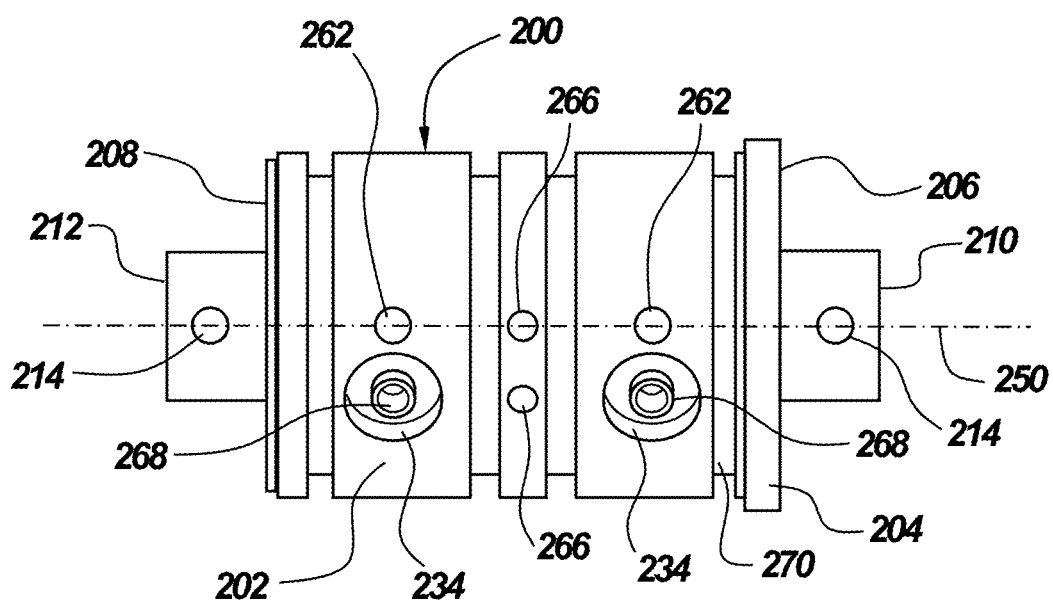
FIG. 14 is a front view of the spool valve of FIG. 13 once rotated 90 degrees about a respective axis of rotation.
Figure 15:
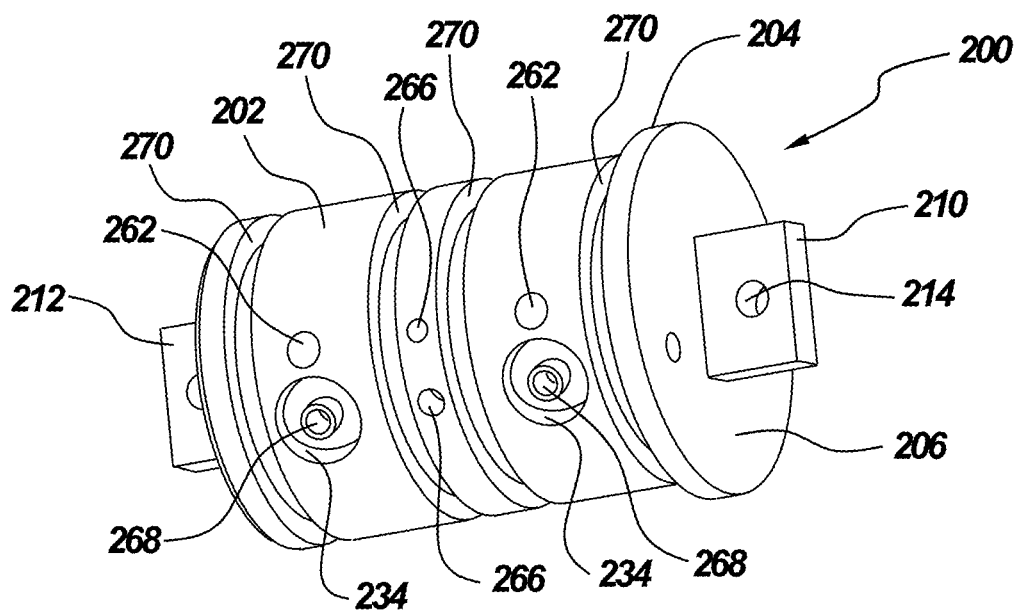
FIG. 15 is a perspective view of the spool valve of FIGS. 13 and 14.

The housing 102 further comprises a handle 104. In a first, illustrated embodiment, the handle is also provided of metal and is either integrally formed with the housing or is attached thereto. Such attachment may be by way of threaded fasteners (not shown) screwed into threaded holes 112 formed in the bottom face 142 of the housing, as shown in FIG. 12. In FIGS. 1, 2 and 3 the handle is illustrated as extending downward and backward for ease of use, though other configurations may be employed.

With respect to FIGS. 13-19B, a spool valve 200 having a substantially cylindrical spool valve body 202 is configured and dimensioned to be rotatably received within the spool valve socket 124, though the disclosed and described spool valve may also be used within foam dispensers other than that described herein, as long as such alternative foam dispensers are provided with a cooperatively dimensioned circular recess 240 and projection 244, as described below. Preferably, the spool valve is also provided of metal such as aluminum. A metallic housing and metallic spool valve enable fabrication with more precise tolerances, enabling a more fluid-tight connection therebetween. The spool valve has first and second ends 206, 208 which are mutually parallel. The spool valve also has an axis of symmetry 250 therethrough.

Extending from each of the first and second ends 206, 208 along the axis of symmetry are respective first and second tabs 210, 212. In the illustrated embodiment, each tab is a rectangular solid. Both tabs in the illustrated embodiment are coplanar and are preferably integrally formed with the remainder of the spool valve 200. Each tab is provided with a socket 214 in the illustrated embodiment. These sockets may be internally threaded for receiving a threaded fastener (not shown) therein.

The foam dispenser 100 also comprises a trigger 106 having first and second arms 107A, 107B dimensioned to extend on either side of the housing 102 for selective engagement with the tabs 210, 212 of the spool valve 200. Each arm may have a bore 114 that may be aligned with a respective tab socket 214 whereby a threaded fastener may extend through the bore and engage with the threaded socket, thereby releasably affixing the trigger to the spool valve. In this manner, rotational actuation of the trigger with respect to the handle 104 causes rotation of the spool valve within the spool valve socket 124. A resilient member 108, disposed between the trigger and the handle or the housing body 102, biases the trigger away from the handle, thus rotating the spool valve into a closed orientation, as will be discussed subsequently. Compression of the resilient member, such as by an operator squeezing the trigger relative to the handle, causes the rotation of the spool valve into an open orientation. The resilient member may be a coiled spring, a leaf spring, a torsion spring, etc., as known to one skilled in the art.

The spool valve also comprises at the first end 206 thereof a flange 204 that is coplanar with the second end 208, coaxial with the spool valve body 202, and orthogonal to the axis of symmetry 250. The diameter of the flange is greater than that of the spool valve body. The housing 102 comprises a substantially circular recess 240 on the second side 128 of the housing 102 about the spool valve socket 124 for receiving the spool valve flange 204 therein when the spool valve body is fully received within the spool valve socket.

Figure 19A:
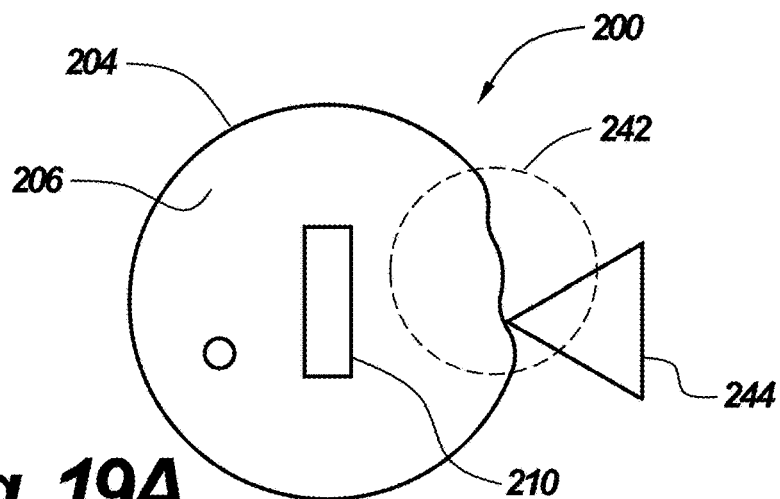
FIGS. 19A and 19B are side views of the spool valve of FIGS. 13-15 interacting with a portion of the housing of FIGS. 5 and 6.
Figure 19B:
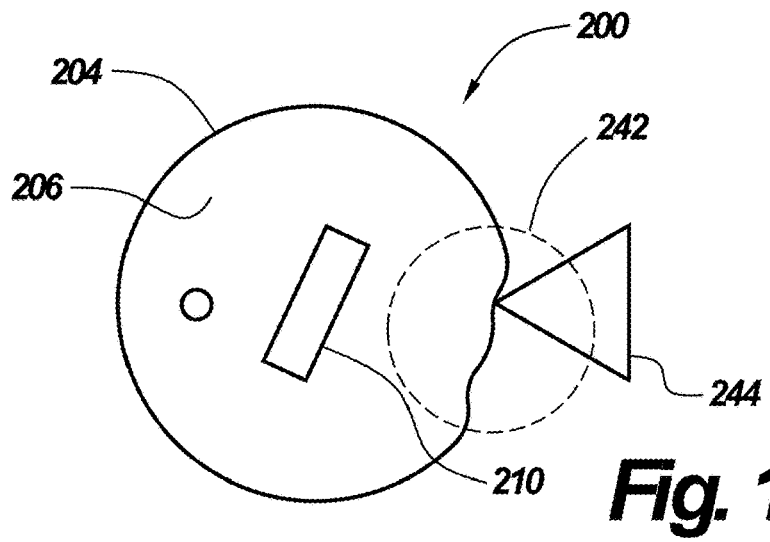

The spool valve flange 204 has a region of decreased diameter 242 relative to the remainder of the substantially circular flange along one radial portion thereof, as shown in FIGS. 19A and 19B. The substantially circular recess 240 about the spool valve socket 124 has a radial projection 244 extending inwardly, as shown in FIGS. 6, 7 and 8. When the spool valve 200 is disposed within the spool valve socket, the radial projection extends into the region of decreased diameter. The spool valve is thus rotatable within the spool valve socket in a first rotational direction until the radial projection mechanically interferes with one end of the radial region of decreased diameter. Likewise, the spool valve is rotatable in a second, opposite rotational direction within the spool valve socket until the radial projection mechanically interferes with the other end of the radial region of decreased diameter. The radial region of decreased diameter is configured on the edge of the flange, with respect to channels within the spool valve such that the spool valve rotation is limited by interference with the radial projection between a first, open orientation and a second, closed orientation.

The spool valve 200 has plural first channels 220 therein and at least one second channel 222 therein, with reference to FIGS. 16A, 16B, 17A, and 17B. Each of the first channels in the spool valve lies within a plane that is orthogonal to the axis of symmetry 250 and has a respective first channel inlet 260 on the substantially cylindrical outer surface of the spool valve body 202 and a respective first channel outlet 262 on the substantially cylindrical outer surface of the spool valve body. In a first embodiment, the respective first channel inlet and first channel outlet are radially separated by 120 degrees or more about the axis of symmetry. In the illustrated embodiment, the respective first channel inlet and first channel outlet are radially separated by 180 degrees about the axis of symmetry.

Figure 17A:
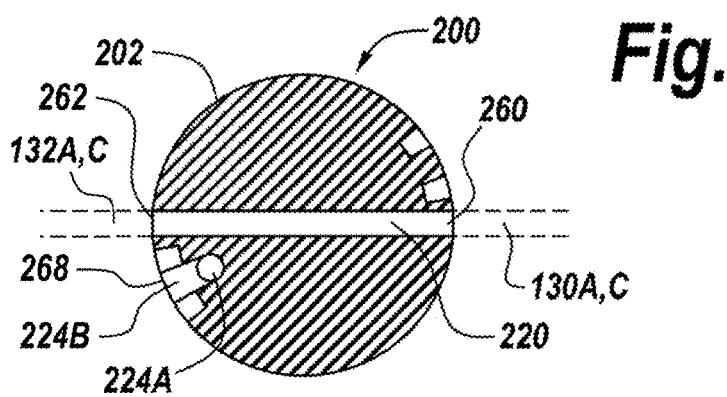
FIGS. 17A and 17B are second side section views of the spool valve of FIGS. 13-15.
Figure 17B:
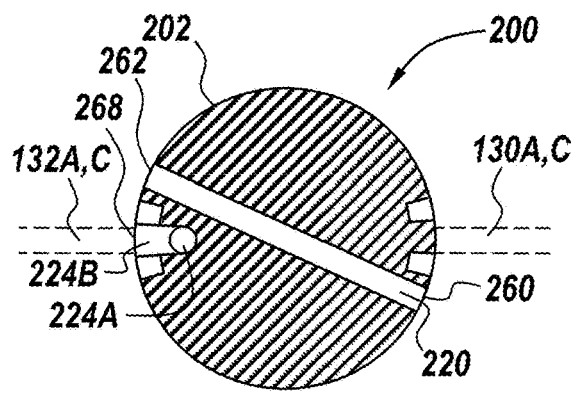
Figure 18:
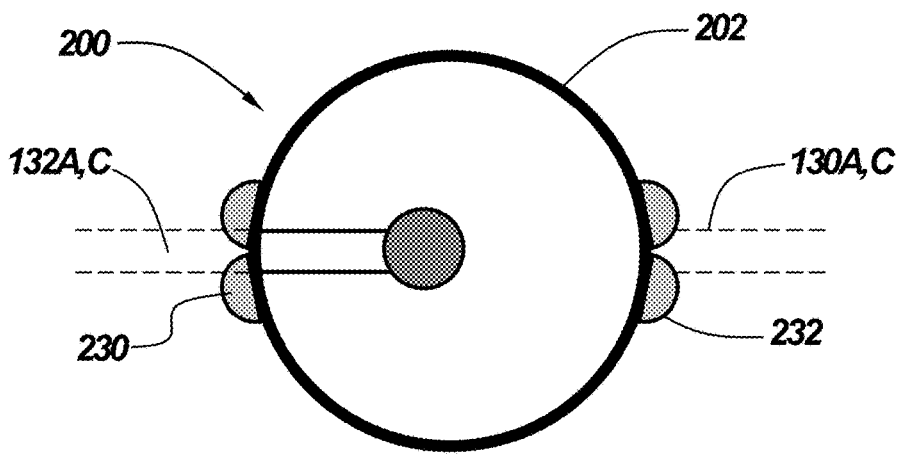
FIG. 18 is a third side section view of the spool valve of FIGS. 13-15.

The first channel inlet 260 and the first channel outlet 262 are in registration with a respective one of the plural inlet channels 130A, 130C and a respective one of the plural outlet channels 132A, 132C when the spool valve is in the open orientation, as shown in FIG. 17A. The same plural inlet channels 130A, 130C are effectively closed by the spool valve body 202 when the spool valve is in the closed orientation, as shown in FIG. 17B, at which point neither the first channel inlet 260 or first channel outlet 262 align with any other channel.

Figure 16A:
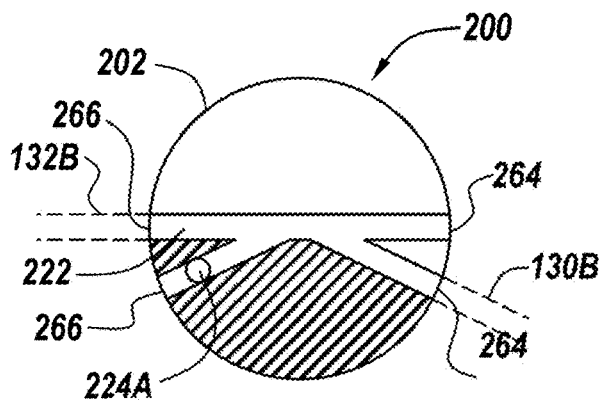
FIGS. 16A and 16B are first side section views of the spool valve of FIGS. 13-15.
Figure 16B:
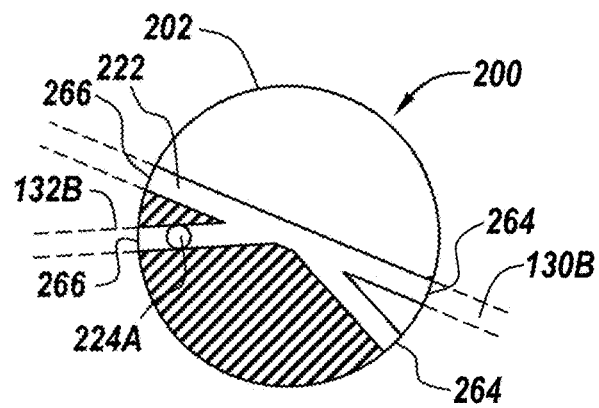

The spool valve also has at least one second channel 222 formed within the spool valve body 202, each second channel lying within a plane that is orthogonal to the axis of symmetry 250, as shown in particular in FIGS. 16A and 16B. Each second channel has two second channel inlets 264 on the substantially cylindrical outer surface of the spool valve body 202 and two second channel outlets 266 on the substantially cylindrical outer surface of the spool valve body 202. In the illustrated embodiment there is one second channel 222 disposed intermediate two first channels 220 along the length of the spool valve body.

The second channel inlets 264 and second channel outlets 266 are in mutual communication within the spool valve body 202. In a first embodiment, the two second channel inlets are radially separated by between 5 and 30 degrees about the axis of symmetry 250, and the two second channel outlets are radially separated by between 5 and 30 degrees about the axis of symmetry. In the illustrated embodiment, the separation between inlets and between outlets is 17.5 degrees. In one embodiment, the minimum separation between a second channel inlet and a second channel outlet is 120 degrees. In the illustrated embodiment, this minimum separation is 145 degrees.

The spool valve 200 also has at least one third channel 224 within the spool valve body 202. Each third channel has a first segment 224A that is parallel to the axis of symmetry 250 and at least one second segment 224B that is orthogonal to the axis of symmetry, each second segment of the at least one third channel having a respective outlet 268 on the surface of the substantially cylindrical spool valve body 202. Each spool valve third channel outlet and a first channel outlet 132A, 132C lie within a plane that is orthogonal to the axis of symmetry. Each of the third channels thus interconnects a respective one of the at least one second channel 222 with at least one second segment outlet 268.

In the illustrated embodiment, the one inlet channel 130B is connected to one outlet channel 132B via the spool valve second channel 222 when the spool valve 200 is rotated into the open orientation, as illustrated in FIG. 16A, via a second channel inlet 264 and a second channel outlet 266. In the same open orientation, the two inlet channels 130A, 130C are connected to two outlet channels 132A, 132C via a first channel inlet 260 and first channel outlet 262 of a respective first channel 220, as illustrated in FIG. 17A.

However, in the closed orientation, the one inlet channel 130B is connected to two outlet channels 132A, 132C via the spool valve second channel 222 and the spool valve third channel 224, as illustrated in FIG. 17B. The same inlet channel 130B is also connected to an outlet channel 132B when the spool valve is rotated to the closed orientation, as illustrated in FIG. 16B. In this manner, when the spool valve is closed, gas supplied within the middle inlet channel 130B flows through the respective spool valve second channel 222 to the respective outlet channel 132B, as well as through the spool valve third channel 224, comprised of first and second segments 224A, 224B, to the other outlet channels 132A, 132C that otherwise flow liquid when the spool valve is in the open orientation. Thus, gas may be used to clear residual liquids from the liquid bearing outlet channels 132A, 132C and from the mix tube attached to the mix tube adapter 110. This may prolong the usable life of the mix tube and lessen the frequency of cleaning cycles for the housing 102.

The first segment 224A of the spool valve third channel may be formed as a cylindrical bore through the length of the spool valve body 202, parallel to the axis of symmetry 250. To prevent gas from flowing out the first and second ends 206, 208 of the spool valve, an outer portion of the first segment may be blocked such as through the use of a set screw (not shown) in the first segment at each of the first and second ends 206, 208.

To inhibit the lateral flow of liquids and gases along the surface of the spool valve 200 when disposed within the spool valve socket 124, the spool valve may further be provided with peripheral grooves 270, orthogonal to the axis of symmetry 250, for receiving therein O-rings (not shown).

A method of using the foregoing foam dispenser 100 with spool valve 200 includes connecting a liquid supply line to plural inlet channels 130A, 130C. The trigger 106 is selectively squeezed or actuated to rotate the spool valve within the spool valve socket 124 from a closed orientation to an open orientation, whereby liquid flows through the spool valve to the outlet end of the housing, as described above. Releasing the trigger allows the resilient member 108 to bias the trigger away from the handle 104, bringing the spool valve into the closed orientation, whereby liquid is prevented from flowing through the spool valve.

The method may also include connecting a gas supply line to an inlet channel 130B. In the open orientation, gas is flowed from a respective inlet channel 130B to a respective outlet channel 132B. In the closed orientation, gas is flowed from the respective inlet channel 130B to the respective outlet channel 132B and to the outlet channels 132A, 132C otherwise used to flow liquid when in the open orientation, thereby enabling the clearing of these liquid outlet channels and the mix tube affixed to the mix tube adapter 110.

While the illustrated embodiment of the spool valve 200 includes one second channel 222 laterally disposed intermediate two first channels 220, a further embodiment of the spool valve of the present invention may further include a fourth channel also intermediate two first channels along with the second channel 222. Such a spool valve may then provide a gaseous blowing agent through one of the second and fourth channels and a gas for liquid channel clearing through the other of the second and fourth channels when in the closed orientation. The channel providing gas for liquid channel clearing would thus be connected to the liquid outlet channels 132A, 132C when the spool valve is in the closed orientation, such as via structures akin to the third channel 224 as described above.

The foregoing description has been directed to particular embodiments. However, other variations and modifications may be made to the described embodiments, with the attainment of some or all of their advantages. It will be further appreciated by those of ordinary skill in the art that modifications to the above-described systems and methods may be made without departing from the concepts disclosed herein. Accordingly, the invention should not be viewed as limited by the disclosed embodiments. Furthermore, various features of the described embodiments may be used without the corresponding use of other features. Thus, this description should be read as merely illustrative of various principles, and not in limitation of the invention.

Many changes in the details, materials, and arrangement of parts and steps, herein described and illustrated, can be made by those skilled in the art in light of teachings contained hereinabove. Accordingly, it will be understood that the following claims are not to be limited to the embodiments disclosed herein and can include practices other than those specifically described, and are to be interpreted as broadly as allowed under the law.

The invention claimed is:

1. A foam dispenser, comprising:
   a metal housing comprising:
     an inlet end, an outlet end, and a spool valve socket intermediate the inlet end and the outlet end, the spool valve socket extending laterally between opposite sides of the housing;
     plural inlet channels formed in the metal housing intermediate the inlet end and the spool valve socket; and
     plural outlet channels formed in the metal housing intermediate the spool valve socket and the outlet end, the plural outlet channels including a plurality of first outlet channels and at least one second outlet channel;
   a metal handle in mechanical communication with the metal housing proximate the inlet end thereof;
   a substantially cylindrical spool valve having first and second opposite ends and selectively rotatable within the spool valve socket between an open orientation and a closed orientation, wherein the spool valve defines plural first channels and at least one second channel therein, the at least one second channel having two second channel inlets and two second channel outlets, the plural first channels configured to channel fluid towards the plurality of first outlet channels when the spool valve is in the open orientation, the at least one second channel configured to channel fluid from one of the two second channel inlets and through one of the two second channel outlets not axially aligned with the one of the two second channel inlets towards the at least one second outlet channel with which it is in fluid communication when the spool valve is in the open orientation and configured to channel fluid from the other of the two second channel inlets towards the plurality of first outlet channels with which it is in fluid communication when the spool valve is in the closed orientation;
   a trigger mechanically couplable to the first and second opposite ends of the spool valve;
   a resilient member intermediate the trigger and at least one of the housing and the handle for mechanically biasing the trigger away from the handle when the spool valve is disposed within the spool valve socket and the trigger is coupled to the first and second opposite ends of the spool valve; and
   a mix tube adapter at the outlet end of the housing configured for selective mechanical engagement of a mix tube to the outlet end of the metal housing, the mix tube having an inlet in registration with the plural outlet channels in the metal housing outlet end when engaged therewith.

2. The foam dispenser of claim 1, wherein the plural inlet channels in the metal housing inlet end are substantially circular in cross-section and are provided with sockets each having internal threads for cooperatively receiving feed supply lines having complimentary threads on an external surface thereof.

3. The foam dispenser of claim 1, wherein each of the plural first channels of the spool valve has an inlet in registration with a respective one of the plural inlet channels and an outlet in registration with a respective one of the plurality of first outlet channels when the spool valve is in the open orientation within the spool valve socket, the inlet and outlet of each of the first channels not being in registration with the respective one of the plural inlet channels and the respective one of the plurality of first outlet channels when the spool valve is in the closed orientation.

4. The foam dispenser of claim 3, wherein the at least one second channel of the spool valve has plural inlets one of which is in registration with a respective one of the plural inlet channels and plural outlets one of which is in registration with the at least one second outlet channel when the spool valve is in the open orientation and in registration with at least one of the plurality of first outlet channels when the spool valve is in the closed orientation.

5. The foam dispenser of claim 4, wherein the spool valve defines at least one third channel therein in communication with the at least one second channel, each of the at least one third channel has at least one outlet in registration with at least one of the plural outlet channels when the spool valve is in the closed orientation.

6. The foam dispenser of claim 5, wherein the spool valve comprises a first O-ring disposed in an outer surface of the spool valve about each third channel outlet, intermediate each third channel outlet and the respective outlet channel when the spool valve is in the closed orientation.

7. The foam dispenser of claim 6, wherein the spool valve further comprises a second O-ring on the spool valve outer surface radially opposite each first O-ring, a portion of each of the first and second O-rings being intermediate the spool valve and the spool valve socket.

8. The foam dispenser of claim 7, wherein each of the first and second O-rings are received within a respective circular depression within an outer surface of the spool valve.

9. The foam dispenser of claim 1, wherein the spool valve comprises a valve body and a substantially circular flange on the first end of the spool valve body, the flange being coaxial with the spool valve body and having a diameter greater than the maximum diameter of the spool valve body.

10. The foam dispenser of claim 9 wherein the housing comprises a substantially circular recess in the second side of the housing about the spool valve socket for receiving the spool valve flange therein.

11. The foam dispenser of claim 10, wherein the flange has a radial region of decreased diameter relative to the remainder of the substantially circular flange and the substantially circular recess has a projection extending inwardly from an outer diameter of the recess, whereby the projection extends into the radial region of decreased diameter when the spool valve is disposed within the spool valve socket.

12. The foam dispenser of claim 11, wherein the spool valve is rotatable within the spool valve socket in a first direction until the radial projection abuts a first end of the radial region of decreased diameter and is rotatable within the spool valve socket in a second direction until the radial projection abuts a second end of the radial region of decreased diameter, the radial projection cooperating with the radial region of decreased diameter to limit the degree to which the spool valve is rotatable within the spool valve socket, between the open orientation and the closed orientation.

13. The foam dispenser of claim 9, wherein the spool valve comprises an axis of symmetry therethrough, a first tab extending outwardly along the axis of symmetry from the first end, and a second tab extending outwardly along the axis of symmetry from the second end, the first and second tabs each being couplable to the trigger.

14. A method of generating foam, comprising:
providing a foam dispenser comprising:
a metal housing comprising:
an inlet end, an outlet end, and a spool valve socket intermediate the inlet end and the outlet end, the spool valve socket extending laterally between opposite sides of the housing;
plural inlet channels formed in the metal housing intermediate the inlet end and the spool valve socket; and
plural outlet channels formed in the metal housing intermediate the spool valve socket and the outlet end, the plural outlet channels including a plurality of first outlet channels and at least one second outlet channel;
a metal handle in mechanical communication with the metal housing proximate the inlet end thereof;
a substantially cylindrical spool valve having first and second opposite ends and selectively rotatable within the spool valve socket between an open orientation and a closed orientation, wherein the spool valve defines plural first channels and at least one second channel therein, the at least one second channel having two second channel inlets and two second channel outlets, the plural first channels configured to channel fluid towards the plurality of first outlet channels when the spool valve is in the open orientation, the at least one second channel configured to channel fluid from one of the two second channel inlets and through one of the two second channel outlets not axially aligned with the one of the two second channel inlets towards the at least one second outlet channel with which it is in fluid communication when the spool valve is in the open orientation and configured to channel fluid from the other of the two second channel inlets towards the plurality of first outlet channels with which it is in fluid communication when the spool valve is in the closed orientation;
a trigger mechanically couplable to the first and second opposite ends of the spool valve;
a resilient member intermediate the trigger and at least one of the housing and the handle for mechanically biasing the trigger away from the handle when spool valve is disposed within the spool valve socket and the trigger is coupled to the first and second opposite ends of the spool valve; and
a mix tube adapter at the outlet end of the housing configured for selective mechanical engagement of a mix tube to the outlet end of the metal housing, the mix tube having a static mixer therein and an inlet in registration with the plural outlet channels in the metal housing outlet end when engaged therewith; and
selectively actuating the trigger to rotate the spool valve within the spool valve socket from a closed orientation to an open orientation, whereby liquid provided by the liquid supply lines is flowable through the spool valve to the outlet end.

15. The method of claim 14, further comprising connecting a respective liquid supply line to plural ones of the plural inlet channels in the metal housing.

16. The method of claim 15, wherein connecting a respective liquid supply line to plural inlet channels comprises threading a male threaded connector provided on an end of the liquid supply line into a female threaded socket forming a portion of the respective inlet channel.

17. The method of claim 14, further comprising connecting a respective gas supply line to at least one of the plural inlet channels in the metal housing.

18. The method of claim 14, wherein each of the plural first channels in the spool valve is in registration with a respective one of the plural inlet channels and a respective one of the plurality of first outlet channels when the spool valve is in the open orientation within the spool valve socket and is not in registration with the respective one of the plural inlet channels and the respective one of the plurality of first outlet channels when the spool valve is in the closed orientation.

19. The method of claim 18, wherein the at least one second channel in the spool valve is in registration with a respective one of the plural inlet channels and the at least one second outlet channel when the spool valve is in the open orientation and in registration with at least one of the plurality of first outlet channels when the spool valve is in the closed orientation.

20. The method of claim 19, wherein the spool valve defines at least one third channel in communication with the at least one second channel, whereby the at least one third channel is in registration with a respective one of the plural outlet channels when the spool valve is in the closed orientation.

21. The method of claim 20, further comprising connecting a respective gas supply line to at least one of the plural inlet channels that is in registration with a respective one of the at least one second channel for flowing gas delivered by the gas supply line through the respective one of the at least one second channel, into the respective one of the at least one third channel, and out through the respective one of the plurality of first outlet channels when the spool valve is in the closed orientation.

22. The method of claim 20, further comprising connecting a respective gas supply line to at least one of the plural inlet channels that is in registration with a respective one of the at least one second channel for flowing gas delivered by the gas supply line through the respective one of the at least one second channel and out through the at least one second outlet channel when the spool valve is in the open orientation.

23. The method of claim 14, wherein:
the spool valve comprises a valve body and a substantially circular flange on the first end of the spool valve body, the flange being coaxial with the spool valve body and having a diameter greater than the maximum diameter of the spool valve body;
the housing comprises a substantially circular recess in the second side of the housing about the spool valve socket for receiving the spool valve flange therein;
the flange has a radial region of decreased diameter relative to the remainder of the substantially circular flange and the substantially circular recess has a projection extending inwardly from an outer diameter of the recess, whereby the projection extends into the radial region of decreased diameter when the spool valve is disposed within the spool valve socket; and
the step of selectively actuating the trigger to rotate the spool valve within the spool valve socket from a closed orientation to an open orientation comprises rotating the spool valve within the spool valve socket in a first direction until the radial projection abuts a first end of the radial region of decreased diameter and rotating the spool valve within the spool valve socket in a second direction until the radial projection abuts a second end of the radial region of decreased diameter, the radial projection cooperating with the radial region of decreased diameter to limit the degree to which the spool valve is rotatable within the spool valve socket, between the open orientation and the closed orientation.

* * * * *